Jan. 5, 1954
R. B. J. BRUNN
2,665,378
PULSE-SIGNAL TRANSLATING SYSTEM
Filed March 26, 1949
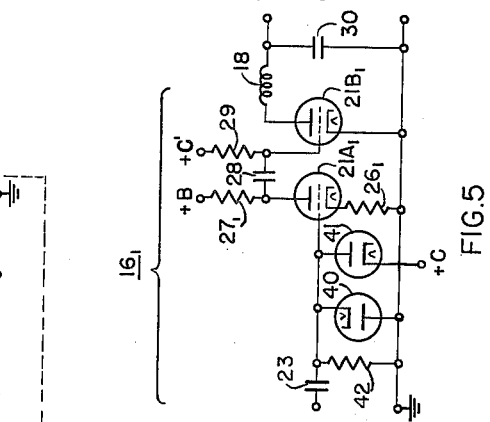
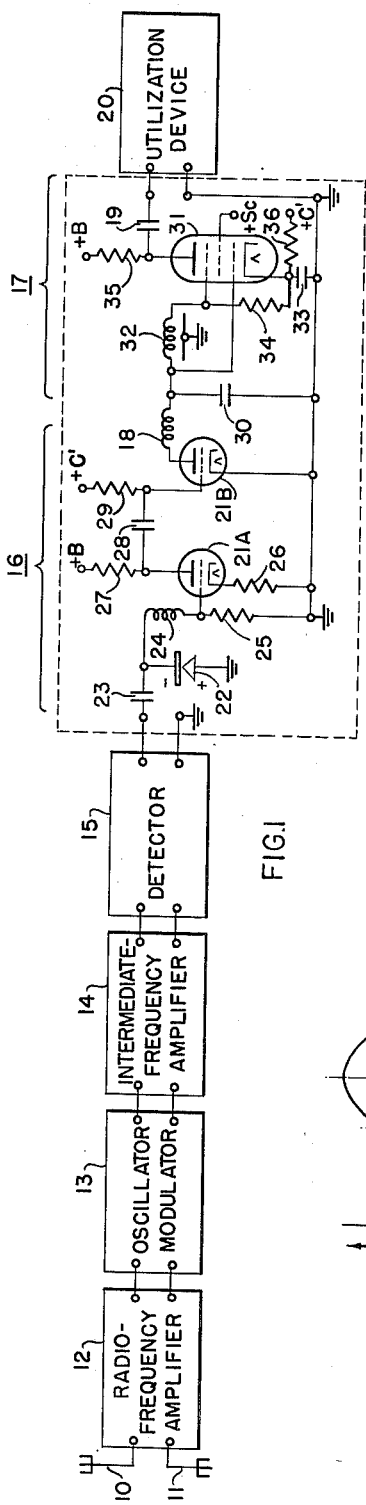
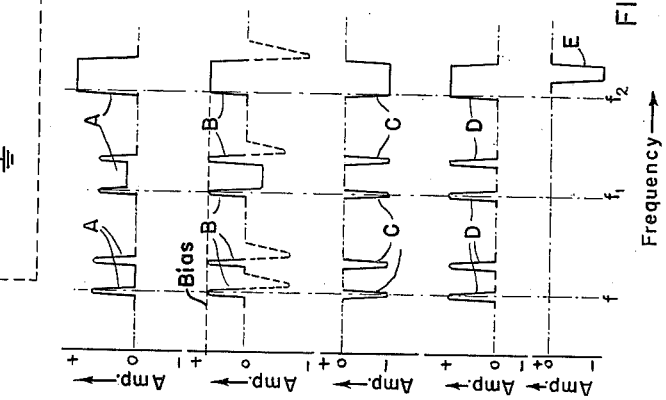
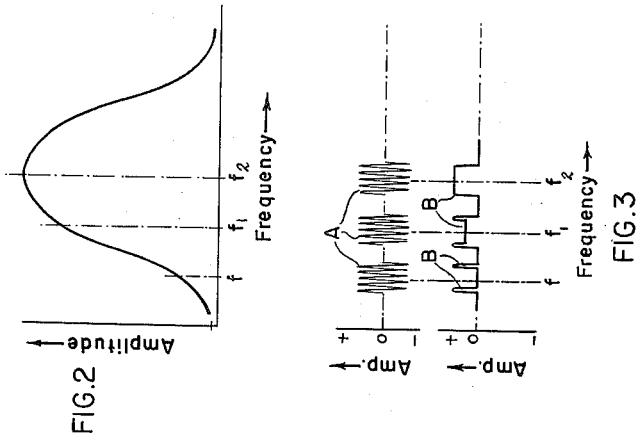
INVENTOR.
ROBERT B. J. BRUNN
BY
ATTORNEY Patented Jan. 5, 1954

2,665,378

UNITED STATES PATENT OFFICE 2,665,378

PULSE-SIGNAL TRANSLATING SYSTEM

Robert B. J. Brunn, Manhasset, N. Y., assignor to Hazeltine Research, Inc., Chicago, Ill., a corporation of Illinois Application March 26, 1949, Serial No. 83,658

17 Claims. (Cl. 250—27)

The present invention relates, in general, to pulse-signal translating systems and, particularly, to systems for translating applied desired pulses which have a predetermined pulse duration while discriminating against applied undesired pulses, at least a portion of each of which has a pulse duration less than the aforesaid predetermined duration. Such systems are highly receptive or selective to pulses having a predetermined mean pulse fundamental frequency but are capable of substantially rejecting pulses having other mean frequencies. While the invention is subject to a variety of applications, it is especially suited for use in the pulse-signal receiver of distance-measuring equipment in which the distance information is produced by means of wave-signal pulses, and it will be particularly described in that connection.

In pulse-signal translating systems, it is often desirable to distinguish a desired group of pulses having predetermined frequency characteristics from pulses having different frequency characteristics or different phase relationships. For instance, in order to increase the selectivity or response of a receiver to pulses that are received from beacons used with a distance-measuring equipment system from pulses received from other pulse-modulated equipment operating on adjacent carrier frequencies, it is necessary to employ circuit means for selecting the desired pulses from the undesired pulses. Normally, the rectangular pulses that are commonly employed in distance-measuring equipment and that are received from the beacons of the distance-measuring equipment have a wide frequency spectrum. The pulses of beacons operating on adjacent frequencies, therefore, have frequency components which fall within the pass band of the receiver being employed. Because the latter pulses do not fall fully within the frequency pass band of the receiver, they are highly differentiated while passing through the receiver and therefore normally produce pulses in the output circuit of the receiver which have very short pulse durations. Those adjacent carrier-frequency pulses that are received and are very nearly within the center of the pass band of the receiver tuned circuits are only partially differentiated so as to appear at the output of the receiver as pulses of very short duration superimposed on the top of the rectangular wave pulses. The presence of these pulses other than the desired pulses and the facility with which at least a portion of these pulses may pass through the pass band of the receiver produce undesired and spurious signals in the utilization circuit of the receiver and diminish the selectivity of the receiver to the desired pulses. It is, therefore, desirable to eliminate from within the pass band all pulses which are produced by other than pulses of desired frequency and pulse-duration characteristics.

One type of frequency-responsive network which has previously been used for such a purpose discriminates against pulses of a very short duration and passes only those pulses having a pulse duration greater than a predetermined duration. In this type of arrangement, all pulses of less than the predetermined desired pulse duration are eliminated but those pulses which are very close in frequency to the desired pulse, as has been stated above, will have portions of a very short pulse duration and portions having a pulse duration very similar to the pulse duration of the desired pulse. Therefore, though the discriminating circuit will eliminate the short pulse-duration portions it will permit the other portions of the pulse to be translated to the utilization circuit even though the portion of the pulse that is so translated has a frequency characteristic different from the desired frequency characteristic. Therefore, a disadvantage of this type of pulse selectivity arrangement lies in its inability completely to discriminate against all portions of the undesired pulses.

It is an object of this invention, therefore, to provide a pulse-signal translating system which substantially avoids the disadvantage of the prior arrangement just mentioned.

It is another object of this invention to provide an improved pulse-signal translating system having a greatly improved pulse-selectivity characteristic.

It is a further object of this invention to provide a new and improved pulse-signal translating system capable of distinguishing between desired pulses having certain desired pulse durations and undesired pulses not having such pulse durations.

In accordance with a particular form of the invention, a pulse-signal translating system for translating applied desired pulses having a predetermined pulse duration and for discriminating against applied undesired pulses at least a portion of each of which has a pulse duration less than the predetermined pulse duration, comprises a first repeater circuit including an input circuit responsive to the applied pulses and having a signal-stabilization network including circuit elements so proportioned as to cause the peaks of the applied pulses to be stabilized at the same potential for effecting translation of only a portion of the peak amplitude of each of the undesired pulses and the translation of at least a portion of the peak amplitude of each of the desired pulses therethrough. The system also includes a second repeater circuit which is coupled to the first repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portions of each of the undesired pulses translated by the first repeater.

For a better understanding of the present invention, together with other and further objects thereof, reference is had to the following description taken in connection with the accompanying drawing, and its scope will be pointed out in the appended claims.

Referring now to the drawing, Fig. 1 is a circuit diagram, partly schematic, of a complete wave-signal receiver including a pulse-signal translating system embodying the present invention in a particular form; Fig. 2 is a curve representing an operating characteristic of the wave-signal receiver of Fig. 1; Figs. 3 and 4 are graphs which are utilized in explaining the operation of the pulse-signal translating system represented in Fig. 1; and Fig. 5 is a circuit diagram of a modification of the pulse-signal translating system represented in Fig. 1.

Referring now more particularly to Fig. 1 of the drawing, there is represented a pulse-signal distance-measuring receiver comprising an antenna system 10, 11 for intercepting pulse-modulated carrier-frequency wave signals and for applying such signals to a radio-frequency amplifier 12 of one or more stages to which are coupled, in cascade, an oscillator-modulator 13, an intermediate-frequency amplifier 14, of one or more stages, and a detector 15. The selective circuits included in the radio-frequency and intermediate-frequency amplifiers 12 and 14 are such as efficiently to translate both the received pulse-modulated distance-measuring wave signal and interfering or undesired other pulse-modulated wave signals to the output circuit of detector 15. The detector 15 is adapted to derive both desired and undesired pulses of a received pulse-modulated wave signal. The units 12, 13, and 14 comprise a signal-translating channel including a frequency-selective signal-translating device, specifically, the amplifier 12 being responsive to one group of pulses of a wave signal of predetermined frequency in preference to other groups of pulses of other wave signals of other frequencies. The amplifier 12 is adapted to translate the one group of pulses so that they have a predetermined pulse duration and to translate the other groups of pulses so that at least a portion of each thereof has a pulse duration less than the aforesaid predetermined pulse duration. The detector 15 is responsive to the pulses translated through the units 12, 13, and 14 for deriving from the translated pulses of the one group desired unidirectional pulses having the aforesaid predetermined pulse duration and for deriving from the translated pulses of the other groups undesired unidirectional pulses at least a portion of each of which has a pulse duration less than the aforesaid predetermined pulse duration.

The receiver also includes a pulse-signal translating system embodying the present invention in a particular form. This system includes a first repeater circuit 16 and a second repeater circuit 17. The repeater circuit 16 has an input circuit coupled to the output circuit of detector 15 and an output circuit which is coupled to the second repeater circuit 17. These first and second repeater circuits will be described in detail hereinafter. The output circuit of the second repeater circuit 17 is coupled through a condenser 19 to a conventional utilization device 20 which may comprise a cathode-ray tube indicator.

It will be understood that the receiver preferably includes tuned circuits, included in or preceding the detector 15, for selecting desired pulse-modulated carrier frequencies and for substantially rejecting undesired pulse-modulated carrier frequencies. These tuned circuits may be of any type, insofar as the present invention is concerned and many such circuits, per se, are well known to those skilled in the art. It is also understood that these circuits have the characteristic of translating desired pulses of the proper frequencies in a well-known manner while translating portions of pulses having frequencies that come within the resonant-frequency band in a highly differentiated form. As a result, the output circuit of detector 15 will include normal rectangular-wave pulses and highly differentiated rectangular-wave pulses as appear in Fig. 3 of the drawing.

It will also be understood that all the components of the pulse-modulated signal receiver with exception of components 16 and 17 may be of any suitable conventional construction and operation, details of which are well known in the art, rendering detailed description thereof unnecessary. Considering briefly the operation of the receiver as a whole, and neglecting for the moment the exact details of the pulse-signal translating system, a pulse-modulated carrier-frequency signal is intercepted by the antenna system 10, 11, selected and amplified by the radio-frequency amplifier 12, converted to an intermediate-frequency signal by the frequency changer including the oscillator-modulator 13, amplified in the intermediate-frequency amplifier 14, and detected by the detector 15, thereby to derive the pulse-signal modulation components. The pulse-signal components are, in turn, translated through the first repeater circuit 16, the second repeater circuit 17 and are utilized in the device 20 in a conventional manner. For instance, these pulse signals may provide an indication of the distance between two points or, by comparison with other pulse signals or the time of arrival of other pulse signals, may be utilized to determine the direction of an object from a common point.

In considering the operation of the receiver arrangement as a whole, reference is made to the series of graphs and curves of Figs. 2 and 3, indicating the receiver response for the conditions in which a pulse-modulated wave signal of desired characteristics is intercepted by antenna system 10, 11 while undesired pulse-modulated wave signals are also being intercepted. Fig. 2 represents the amplitude characteristics of radio-frequency amplifier 12 for different carrier frequencies of pulse wave signals. It is readily evident that pulse signals having a mean frequency $f$ are normally translated through amplifiers 12 and 14 at a very low amplitude level; pulse signals having an average mean frequency $f_1$ are translated at a slightly higher amplitude level, while pulse signals having a mean frequency $f_2$, being the signals of the frequency to which the radio-frequency amplifier is tuned, are translated at the greatest amplitude level. In a circuit employing normal resonant-frequency amplitude discrimination methods, the relative amplitudes between signals of mean frequency $f_2$ and those of mean frequency $f_1$ or $f$ would be sufficient to discriminate in favor of the higher amplitude signals. When using resonant circuit selection arrangements for pulse signals having a wide spectrum of frequencies, this method of discrimination alone is not sufficient as is evident from viewing the curves A and B of Fig. 3.

The curves A of Fig. 3 represent pulse-modulated carrier-frequency wave signals for the frequencies of $f$, $f_1$ and $f_2$ of Fig. 2. When these pulse-modulated carrier-frequency wave signals are passed through radio-frequency amplifier 12, oscillator-modulator 13, intermediate-frequency amplifier 14, and detector 15, they appear at the output circuit of the detector in the form of the pulses shown in curves B of Fig. 3.

Referring again to Fig. 2, it is evident that a pulse having a mean frequency $f$ will fail to come well within the pass band of the receiver system and, therefore, will be translated with diminished amplitude. Still, since the pulse is composed of a wide spectrum of frequencies, some of the higher frequency signals or the harmonics of the lower frequency signals will appear within the pass band. If none of the lower frequency components which form the central portion of the pulse signal fall within the pass band, only the higher frequencies which form the steep edges will pass through the pass band and appear as pulses or spikes of very short duration in the output circuit of detector 15. These pulses are shown for the frequency $f$ in curves B of Fig. 3. Similarly, pulses having a mean frequency of $f_1$ will have some portions translated while other portions will be likewise affected by the characteristics of the resonant circuits of the receiver except that some of the lower frequency components of these pulses will pass through the pass band producing a plateau between the spike-like pulses as shown in Fig. 3. As a result, there will appear in the output circuit of detector 15 pulses having characteristics of the type shown in curves B of Fig. 3 for frequency $f_1$. These pulses will have a portion of comparatively long pulse duration with highly differentiated short duration pulses superimposed on the long duration portion. Pulses having the desired mean frequency of $f_2$, and, therefore, occurring directly within the pass band of the receiver, will be translated in well-known manner and will appear in the output circuit of detector 15 in the form shown in curves B of Fig. 3 for frequency $f_2$. These latter pulses have no highly differentiated portions since they fall well within the pass band of the receiver and are not differentiated by the tuned circuits. Therefore, the pulses of the type shown in curves B of Fig. 3 for frequency $f_2$ are desired pulses having a predetermined pulse duration, while pulses of the type shown in curves B of Fig. 3 for frequencies $f$ and $f_1$ are undesired pulses at least a portion of each of which has a pulse duration less than a predetermined pulse duration.

Referring now more particularly to the part of the system embodying the present invention, the signal-translating system for translating applied desired pulses having a predetermined pulse duration and for discriminating against applied undesired pulses at least a portion of each of which has pulse duration less than the predetermined pulse duration, includes a first repeater circuit 16 which may comprise a pair of electron-tube repeater devices shown as triodes 21A and 21B and a direct-current restorer circuit including rectifier 22 and the control electrode and cathode of tube 21A. The input circuit of repeater 16 is coupled to the output of detector 15 through a condenser 23. This input circuit includes the rectifier 22 and the load circuit comprising a radio-frequency choke 24 and a resistor 25. The control electrode of tube 21A is connected to the junction of radio-frequency choke 24 and resistance 25 and is normally at ground potential when no current is flowing in the resistor 25. The cathode of the tube 21A is degeneratively connected to ground through resistor 26, and is normally at a slightly positive potential with respect to ground. The resistors 25, 26, the choke 24, and the condenser 23 with the cathode and control electrode of the tube 21A comprise a signal-stabilization network in which the elements 23—26, inclusive, are so proportioned as to cause the peaks of the pulses applied to the control electrode of the tube 21A to be stabilized at the same potential. The value of the bias on tube 21A is so proportioned as to translate only a portion of each of the undesired pulses exceeding a selected amplitude level while translating at least a portion of the desired pulses exceeding a selected amplitude level. The rectifier 22 is adapted to stabilize the pulses with respect to ground potential. The anode of tube 21A is connected to a source of potential $+B$ through a load resistor 27 and the output circuit of this tube is coupled from this anode through a condenser 28 to the control electrode of tube 21B. The latter control electrode is also connected through a load resistor 29 to a source of potential $+C'$. The cathode of tube 21B is connected to ground while the anode is connected through a radio-frequency choke 18 and time-delay network 32 to the second control electrode of tube 31. Condenser 30 is connected between the junction of choke 18 and network 32 and ground. The first control electrode of tube 31 is also connected to the junction of choke 18 and network 32. The circuits of tube 31 form a coincidence mixer arrangement. Time-delay network 32 is proportioned to have a delay time sufficiently long to block short duration pulses in the tube 31 while permitting portions of longer duration pulses to be translated therethrough.

The time-delay network 32 and the tube 31 form a second repeater circuit coupled to the first repeater circuit which is so proportioned as to translate desired pulses of a predetermined duration while being unresponsive to the portion of each of the undesired pulses translated by the first repeater. The screen electrode of tube 31 is connected to a suitable source of positive potential indicated $+Sc$, while the cathode of the same tube is connected through condenser 33 to ground and through a resistor 36 to a suitable source of positive bias indicated $+C'$. This cathode is also connected through a resistor 34 to the second control electrode of this tube to provide a cutoff bias for this electrode. The anode of tube 31 is connected through a load resistor 35 to a source of potential $+B$ and through condenser 19 to the utilization device 20. The network 32 and the biasing resistors 34 and 36 comprise a control circuit for controlling the conductivity of the tube 31.

Considering now in particular the operation of the pulse-signal translating system portion of the receiver including first repeater circuit 16 and second repeater circuit 17, the curves A—E of Fig. 4, are especially helpful. Curves A of Fig. 4, show the same pulse forms appearing in the output circuit of detector 15 for carrier frequencies $f$, $f_1$ and $f_2$ as did curves B of Fig. 3. It is desired to translate pulse forms having a predetermined pulse duration as shown in curves A of Fig. 4 for frequency $f_2$ while discriminating against undesired pulses at least a portion of each of which has pulse duration less than the predetermined pulse duration as shown in curves A of Fig. 4 for frequencies $f$ and $f_1$. It is to be understood that the pulses appearing at this point in the receiver circuit may have different relative amplitudes and may also have different average voltages with respect to ground or zero voltage. As the pulses having mean frequencies $f$, $f_1$ and $f_2$ and represented in curves A of Fig. 4 are translated through condenser 23 and are impressed across rectifier 22 and onto the control electrode of tube 21A, they assume the forms shown in curves B of Fig. 4 having been stabilized at their points of highest amplitude with respect to a reference level formed by the potential at which the control electrode of tube 21A draws current. Tube 21A is normally at cutoff. That part of each positive pulse applied to the control electrode of this tube which has potential levels between the positive bias potential of the tube, approximately +C, and the cutoff potential of the tube, approximately zero or ground potential on the control electrode, will be translated therethrough. The remaining positive part of each pulse causes current to flow between the cathode and control electrode of the tube and is not translated. Therefore, the top of each pulse is arranged to have an equal potential above zero or ground. When the down or negative swing of the pulse or spike occurs, a negative potential would be developed across choke 24 and resistor 25 which would be equal in negative potential to the amount by which the positive potential of the pulse exceeded the positive bias of the tube, if rectifier 22 was not in the circuit. This part of the pulses is shown by the dotted lines of curves B of Fig. 4. In practice, rectifier 22 eliminates this negative swing and thereby effects quick recovery of the circuit. Therefore, the electron tube repeater stage including tube 21A is seen to be so proportioned by having the control electrode of tube 21A properly biased that only a small selected amplitude level portion of the high amplitude part of the pulses is translated therethrough, the pulses appearing in the output circuit of the triode having the forms shown in curves C of Fig. 4. In examining the pulses shown in the curves of B and C of Fig. 4, it now becomes evident that the three pulse forms shown in curves A have been converted into two pulse forms; undesired pulses at frequencies $f$ and $f_1$ having pulse durations less than a predetermined pulse duration, and desired pulses at the frequency $f_2$ having a predetermined pulse duration. These pulses are then translated through tube 21B, being amplified and inverted therein, and appear across condenser 30 at the input circuit of tube 31 as positive pulses of the forms shown in curves D of Fig. 4. As has been stated above, the circuits of tube 31 are so proportioned by means of time-delay network 32 and the presence of a cutoff bias on both the first and second control electrodes that this tube is normally at cutoff condition producing no output signal. A positive potential signal appearing on the biased control electrode of this tube will tend to cause the tube to conduct, but the bias on the second control electrode will prevent such conduction unless a positive signal of sufficient strength also appears on this electrode simultaneously with the appearance of the signal on the control electrode. By employing time-delay means 32 in the second control grid circuit and so proportioning it as to have a time delay greater than the time duration of the shortest duration of a pulse which it is desired to translate, all pulses of shorter duration are automatically blocked. Therefore, undesired pulses having pulse durations less than a predetermined pulse duration are blocked by the functioning of coincidence mixer 31 while desired pulses having at least a pulse duration greater than the predetermined value of time-delay means 32 will at least be partially translated and passed through coupling condenser 19 into utilization device 20 as shown by curve E of Fig. 4. Therefore, it is seen that a pulse-signal translating system is provided which will translate applied desired pulses having a predetermined pulse duration and which will discriminate against applied undesired pulses at least a portion of each of which has a pulse duration less than said predetermined pulse duration.

The following circuit constants have been used in one embodiment of the invention constructed in accordance with the arrangement described in Fig. 1:

| | |
|---|---|
| Resistors 25 and 29 | 0.447 megohm. |
| Resistor 26 | 100 ohms. |
| Resistor 27 | 10,000 ohms. |
| Resistor 35 | 47,000 ohms. |
| Resistor 34 | 1,500 ohms. |
| Resistor 36 | 15,000 ohms. |
| Condenser 28 | 1,000 micromicrofarads. |
| Condenser 30 | 47 micromicrofarads. |
| Condenser 33 | 0.5 micromicrofarad. |
| Inductors 24 and 18 | 12 microhenries. |
| Time-delay network 32 | 0.50 microsecond time delay. |
| Tubes 21A and 21B | Type 12AT7 duotriode. |
| Tube 31 | Type 6AS6. |
| Rectifier 22 | Crystal rectifier 1N34. |
| +B potential | 130 volts. |
| +C' | 150 volts |

Referring now to Fig. 5 of the drawing, there is represented schematically a modified form of the pulse-signal translating system of Fig. 1 and embodying this invention. The circuit of Fig. 5 may readily be employed in the receiver of Fig. 1 by replacing first repeater circuit 16 in that receiver with the first repeater circuit shown in Fig. 5. Since the modified form of first repeater circuit 16₁ is similar to that of Fig. 1, corresponding circuit elements are identified by identical reference numerals while similar circuit elements are identified by the same reference numerals primed. In Fig. 5, the first repeater circuit comprises a diode rectifier 40 adapted to be coupled across the output circuit of the detector 15 through the condenser 23 and a load resistor 42. This rectifier comprises a signal-level stabilization circuit for stabilizing pulse signals with respect to a reference level. The cathode of rectifier 40 is also directly connected to the control electrode of electron repeater tube 21A₁. An additional rectifier 41 is connected between this control electrode and a suitable source of slightly positive bias, the anode of the rectifier being connected to the control electrode while the cathode is connected to the source of bias. Rectifier 41 comprises a circuit for so biasing electron repeater tube $21A_1$ that at least a portion of each of the desired pulse signals having a predetermined pulse duration will be translated while only a portion of each of the undesired signals having portions thereof of less than a predetermined pulse duration will be translated. Except for changes in the connection of the control electrode, electron repeater tube $21A_1$ is connected in a similar manner to tube $21A$ of Fig. 1. There are no changes in the connections or circuit constants of tube $21A_1$. Therefore, the detailed connections of tubes $21A_1$ and $21B_1$ will not be described with reference to the embodiment of this figure.

The operation of the first repeater circuit $16_1$ of Fig. 5 is similar to the operation of repeater circuit 16 of Fig. 1 except for the functioning of rectifier 41. In the repeater circuit of Fig. 1, the control electrode of tube 21A derives its bias from the load circuit including radio-frequency coil 24 and resistor 25 and acts in the capacity of a diode when signals of greater than a predetermined signal strength are being translated. In the repeater circuit of Fig. 5, the diode function is provided by means of rectifier 41 which is so proportioned as to conduct in the presence of signals of greater than a predetermined signal strength, thereby stabilizing pulses with respect to the top portions of the pulses. Functioning of a diode rectifier as a stabilizer is well known and will not be described herein in detail. The curves of Fig. 4 are applicable to the operation of the arrangement shown by Fig. 5, and the description of these curves presented above will also suffice to describe the operation of the circuit of Fig. 5.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-signal translating system for translating applied desired pulses having a predetermined pulse duration and for discriminating against applied undesired pulses at least a portion of each of which has a pulse duration less than said predetermined pulse duration comprising: a first repeater circuit including an input circuit responsive to said applied pulses and having a signal-stabilization network including circuit elements so proportioned as to cause the peaks of said applied pulses to be stabilized at the same potential for effecting translation of only a portion of the peak amplitude of each of said undesired pulses and the translation of at least a portion of the peak amplitude of each of said desired pulses through said first repeater circuit; and a second repeater circuit coupled to said first repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portion of said each of said undesired pulses translated by said first repeater.

2. A pulse-signal translating system for translating applied desired pulses having a predetermined pulse duration and for discriminating against applied undesired pulses at least a portion of each of which has a pulse duration less than said predetermined pulse duration comprising: a first repeater circuit including an input circuit responsive to said applied pulses and having a signal-stabilization network including circuit elements so proportioned as to cause the peaks of said applied pulses to be stabilized at the same potential for effecting translation of only the peak amplitude of said portion of each of said undesired pulses which has a pulse duration less than said predetermined duration and the translation of at least a portion of the peak amplitude of each of said desired pulses through said first repeater circuit; and a second repeater circuit coupled to said first repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portion of said each of said undesired pulses translated by said first repeater.

3. A pulse-signal translating system for translating applied desired pulses having a predetermined pulse duration and for discriminating against applied undesired pulses at least a portion of each of which has a pulse duration less than said predetermined pulse duration comprising: a first electron-tube repeater circuit including a cathode and a control electrode responsive to said applied pulses and a signal-stabilization network coupled between said cathode and said control electrode for causing the peaks of said applied pulses to be stabilized at the same potential and for causing said control electrode to have such a negative polarity with respect to said cathode as to cause said repeater circuit to be nonconductive except for the translation of only a portion of each of said undesired pulses exceeding a selected amplitude level and except for the translation of at least a portion of each of said desired pulses exceeding a selected amplitude level through said first repeater circuit; and a second repeater circuit coupled to said first repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portion of said each of said undesired pulses translated by said first repeater.

4. A pulse-signal translating system for translating applied desired positive-going pulses having a predetermined pulse duration and for discriminating against applied undesired pulses at least a portion of each of which has a pulse duration less than said predetermined pulse duration comprising: a first electron-tube repeater circuit including a cathode, a control electrode and an anode responsive to said applied pulses and including a signal-stabilization network coupled between said cathode and said control electrode for causing the peaks of said applied pulses to be stabilized at the same potential and for causing said control electrode to have such a negative polarity with respect to said cathode as to cause said repeater circuit to be nonconductive except for the translation of only a portion of the peak amplitude of each of said undesired pulses and except for the translation of at least a portion of the peak amplitude of each of said desired pulses through said first repeater circuit; a phase-inverted circuit coupled to said anode of said first repeater circuit for inverting the phase of said translated portions of said pulses; and a second repeater circuit coupled to said phase-inverter circuit and including a control circuit for controlling the conductivity of said second repeater circuit said control circuit being responsive to said inverted portions of said desired pulses for effecting translation thereof through said second repeater while said control circuit is substantially unresponsive to the inverted portion of said each of said undesired pulses translated by said phase-inverter circuit.

5. A pulse-signal translating system for translating applied desired pulses having a predetermined pulse duration and for discriminating against applied undesired pulses at least a portion of each of which has a pulse duration less than said predetermined pulse duration comprising: a first repeater circuit including an input circuit responsive to said applied pulses and having a signal-stabilization network including circuit elements so proportioned as to cause the peaks of said applied pulses to be stabilized at the same potential for effecting translation of only a portion of the peak amplitude of each of said undesired pulses and the translation of at least a portion of the peak amplitude of each of said desired pulses through said first repeater circuit; and a coincidence mixer circuit coupled to said first repeater circuit and including a control circuit for controlling the conductivity of said coincidence mixer circuit said control circuit being responsive to said translated portions of said desired pulses for effecting translation of at least a part thereof through said coincidence mixer while said control circuit is substantially unresponsive to the portion of said each of said undesired pulses translated by said first repeater.

6. A pulse-signal translating system for translating applied desired positive-going pulses having a predetermined pulse duration and for discriminating against applied undesired pulses at least a portion of each of which has a pulse duration less than said predetermined pulse duration comprising: a first electron-tube repeater circuit including a cathode and a control electrode responsive to said applied pulses and including a signal-stabilization network coupled between said cathode and said control electrode for causing the peaks of said applied pulses to be stabilized at the same potential and for causing said control electrode to have such a negative polarity with respect to said cathode as to cause said repeater circuit to be nonconductive except for the translation of only a portion of the peak amplitude of each of said undesired pulses and except for the translation of at least a portion of the peak amplitude of each of said desired pulses through said first repeater circuit; a second electron-tube repeater circuit including a cathode and a pair of control electrodes coupled to said first repeater circuit; and a biasing resistor network coupled between said last-mentioned cathode and at least one of said last-mentioned control electrodes for causing said one of said last-mentioned control electrodes to have such a negative polarity with respect to said last-mentioned cathode as to cause said second repeater circuit to be nonconductive except for the translation therethrough of said translated portions of said desired pulses.

7. A pulse-signal translating system for translating applied desired positive-going pulses having a predetermined pulse duration and for discriminating against applied undesired pulses at least a portion of each of which has a pulse duration less than said predetermined pulse duration comprising: a first electron-tube repeater circuit including a cathode and a control electrode responsive to said applied pulses and including a signal-stabilization network coupled between said cathode and said control electrode for causing the positive peaks of said applied pulses to be stabilized at the same potential and for causing said control electrode to have such a negative polarity with respect to said cathode as to cause said repeater circuit to be nonconductive except for the translation of only a portion of the peak amplitude of each of said undesired pulses and except for the translation of at least a portion of the peak amplitude of each of said desired pulses through said first repeater circuit; and a second electron-tube repeater circuit including a cathode and a pair of control electrodes coupled to said first repeater circuit, a time-delay circuit coupled between one of said last-mentioned control electrodes and said first repeater circuit and a biasing resistor network coupled between said last-mentioned cathode and the other of said last-mentioned control electrodes for causing at least said other of said last-mentioned electrodes to have such a negative bias with respect to said last-mentioned cathode as to cause said second repeater to be nonconductive except for coincidence of signals on said last-mentioned control electrodes, thereby to translate through said second repeater said translated portions of said desired pulses.

8. A pulse-signal translating system for translating applied desired pulses having a predetermined pulse duration and for discriminating against applied undesired pulses at least a portion of each of which has a pulse duration less than said predetermined pulse duration comprising: a first repeater circuit including an input circuit responsive to said applied pulses and having a signal-stabilization network including circuit elements so proportioned as to cause the peaks of said applied pulses to be stabilized at the same potential for effecting translation of only a portion of the peak amplitude of each of said undesired pulses and the translation of at least a portion of the peak amplitude of each of said desired pulses through said first repeater circuit; and a second repeater circuit, including a time-delay circuit, coupled to said first repeater circuit and including a biasing circuit so proportioned as to bias said second repeater circuit to cutoff by a biasing potential which is exceeded by the amplitude of said translated portions of said desired pulses translated through said time-delay circuit and applied to said biasing circuit thereby to translate said translated portions of said desired pulses but to be substantially unresponsive to the portion of said each of said undesired pulses translated by said first repeater.

9. A pulse-signal translating system for translating applied desired pulses having a predetermined pulse duration and for discriminating against applied undesired pulses at least a portion of each of which has a pulse duration less than said predetermined pulse duration comprising: a rectifier circuit to which said pulses are applied being so proportioned as to stabilize said pulses with respect to a predetermined reference level; an electron-tube repeater stage coupled to said rectifier and having a signal-stabilization network including circuit elements so proportioned as to cause the peaks of said applied pulses to be stabilized at the same potential for effecting translation of only a portion of the peak amplitude of each of said undesired pulses and the translation of at least a portion of the peak amplitude of each of said desired pulses through said first repeater stages; and a second repeater stage coupled to said electron-tube repeater stage and including a control circuit for controlling the conductivity of said second repeater stage, said control circuit being responsive to said translated portions of said desired pulses for effecting translation of at least a part thereof through said second repeater while said control circuit is substantially unresponsive to the portion of said each of said undesired pulses translated by said electron-tube repeater stage.

10. A pulse-signal translating system for translating applied desired positive-going pulses having a predetermined pulse duration and for discriminating against applied undesired pulses at least a portion of each of which has a pulse duration less than said predetermined pulse duration comprising: a diode rectifier circuit to which said pulses are applied being so biased as to stabilize said pulses with respect to a predetermined reference level; an electron-tube repeater stage coupled to said rectifier and having a signal-stabilization network including circuit elements so proportioned as to cause the positive peaks of said applied pulses to be stabilized at the same potential for effecting translation of only a portion of each of said undesired pulses exceeding a selected amplitude level and the translation of at least a portion of each of said desired pulses exceeding a selected amplitude level through said electron-tube repeater stage; and a second repeater stage coupled to said electron-tube repeater stage and including a biasing circuit so proportioned as to bias said second repeater stage to cutoff by a biasing potential which is exceeded by said translated portions of said desired pulses thereby to translate said translated portions of said desired pulses but to be substantially unresponsive to the portion of said each of said undesired pulses translated by said electron-tube repeater stage.

11. A pulse-signal translating system for translating applied desired pulses having a predetermined pulse duration and for discriminating against applied undesired pulses at least a portion of each of which has a pulse duration less than said predetermined pulse duration comprising: a signal-level stabilization circuit to which said pulses are applied being so proportioned as to stabilize said pulses with respect to a predetermined reference level; an electron-tube repeater circuit coupled to said stabilization circuit and having a signal-stabilization network including circuit elements so proportioned as to cause the peaks of said applied pulses to be stabilized at the same potential for effecting translation of only a portion of the peak amplitude of each of said undesired pulses and the translation of at least a portion of the peak amplitude of each of said desired pulses through said first repeater circuit; and a second repeater circuit coupled to said electron-tube repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portion of said each of said undesired pulses translated by said first repeater.

12. A pulse-signal translating system for translating applied desired pulses having a predetermined pulse duration and for discriminating against applied undesired pulses at least a portion of each of which has a pulse duration less than said predetermined pulse duration comprising: a signal-level stabilization circuit to which said pulses are applied being so biased as to stabilize said pulses with respect to a predetermined signal voltage reference level; an electron-tube repeater circuit coupled to said stabilization circuit and including a signal-stabilization network so proportioned as to cause the peaks of said applied pulses to be stabilized at the same potential and to bias said repeater circuit to cutoff except for the translation of only the peak amplitude of said portions of each of said undesired pulses which have pulse durations less than said predetermined duration and the translation of at least a portion of the peak amplitude of each of said desired pulses which have a predetermined pulse duration; and a second repeater circuit coupled to said translated portions of said electron-tube repeater circuit and including a control circuit for controlling the conductivity of said second repeater circuit said control circuit being responsive to said translated portions of said desired pulses for effecting translation of at least a part thereof through said second repeater while said control circuit is substantially unresponsive to the portion of said each of said undesired pulses translated by said first repeater.

13. A pulse-signal translating system for translating applied desired positive-going pulses having a predetermined pulse duration and for discriminating against applied undesired pulses at least a portion of each of which has a pulse duration less than said predetermined pulse duration comprising: a first amplifier to which said pulses are applied including a signal-stabilization network so proportioned as to effect grid current stabilization of said pulses with respect to a predetermined reference level and which translates only a portion of the peak amplitude of each of said undesired pulses while being effective to translate at least a portion of the peak amplitude of each of said desired pulses; and a second amplifier coupled to said first amplifier and including a biasing circuit being so proportioned as to bias said second amplifier to cutoff by a biasing potential which is exceeded by said translated portions of said desired pulses thereby to translate some pulse durations of said translated portions of said desired pulses but to be substantially unresponsive to the portion of said each of said undesired pulses translated by said first amplifier.

14. A pulse-signal translating system for translating applied desired positive-going pulses having a predetermined pulse duration and for discriminating against applied undesired pulses at least a portion of each of which has a pulse duration less than said predetermined pulse duration comprising: a rectifier circuit to which said pulses are applied being so biased as to eliminate all portions of pulses having a predetermined polarity; a first amplifier to which said pulses are applied including a signal-stabilization network so proportioned as to effect grid current stabilization of said pulses with respect to a predetermined reference level and which translates only a portion of the peak amplitude of each of said undesired pulses while being effective to translate at least a portion of the peak amplitude of each of said desired pulses; and a second amplifier coupled to said first amplifier and including a biasing circuit being so proportioned as to bias said second amplifier to cutoff by a biasing potential which is exceeded by said translated portions of said desired pulses thereby to translate some pulse durations of said translated portions of said desired pulses but to be substantially unresponsive to the portion of said each of said undesired pulses translated by said first amplifier.

15. A pulse-signal selection system for selecting one group of pulses of a wave signal of predetermined frequency in preference to other groups of pulses of other wave signals of other frequencies comprising: a signal-translating channel including a frequency-selective signal-translating device responsive to said one and said other groups of pulses for translating said one group of pulses so that they have a predetermined pulse duration and for translating said other groups of pulses so that at least a portion of each pulse has a pulse duration less than said predetermined pulse duration; a detector coupled to said channel and responsive to said translated pulses for deriving from said translated pulses of said one group desired unidirectional pulses having said predetermined pulse duration and for deriving from said translated pulses of said other groups undesired unidirectional pulses at least a portion of each of which has a pulse duration less than said predetermined pulse duration; a first repeater circuit including an input circuit coupled to said detector and responsive to said derived pulses and having a signal-stabilization network including circuit elements so proportioned as to cause the peaks of said derived pulses to be stabilized at the same potential for effecting the translation through said first repeater circuit of only a portion of the peak amplitude of each of said undesired pulses and the translation of at least a portion of each of said desired pulses; and a second repeater circuit coupled to said first repeater circuit and including a control circuit for controlling the conductivity of said second repeater circuit said control circuit being responsive to said translated portions of said desired pulses for effecting translation thereof through said second repeater while said control circuit is substantially unresponsive to the portion of each of said undesired pulses translated by said first repeater.

16. A pulse-signal selection system for selecting one group of pulses of a wave signal of predetermined frequency in preference to other groups of pulses of other wave signals of other frequencies comprising: a signal-translating channel including a radio-frequency amplifier responsive to said one and said other groups of pulses for translating said one group of pulses so that they have a predetermined pulse duration and for translating said other groups of pulses so that at least a portion of each of which has a pulse duration less than said predetermined pulse duration; a detector coupled to said channel and responsive to said translated pulses for deriving from said translated pulses of said one group desired unidirectional pulses having said predetermined pulse duration and for deriving from said translated pulses of said other groups undesired unidirectional pulses at least a portion of each of which has a pulse duration less than said predetermined pulse duration; a first repeater circuit including an input circuit coupled to said detector and responsive to said derived pulses and having a signal-stabilization network including circuit elements so proportioned as to cause the peaks of said derived pulses to be stabilized at the same potential for effecting the translation of only a portion of the peak amplitude of each of said undesired pulses and the translation of at least a portion of each of said desired pulses through said first repeater circuit; and a second repeater circuit coupled to said first repeater circuit and including a control circuit for controlling the conductivity of said second repeater circuit said control circuit being responsive to said translated portions of said desired pulses for effecting translation thereof through said second repeater while said control circuit is substantially unresponsive to the portion of each of said undesired pulses translated by said first repeater.

17. A pulse-signal selection system for selecting one group of pulses of a wave signal of predetermined frequency in preference to other groups of pulses of other wave signals of other frequencies comprising: a signal-translating channel including a radio-frequency amplifier tuned to said predetermined frequency and responsive to said one and said other groups of pulses for translating said one group of pulses so that they have a predetermined pulse duration and for translating said other groups of pulses so that at least a portion of each of which has a pulse duration less than said predetermined pulse duration; a detector coupled to said channel and responsive to said translated pulses for deriving from said translated pulses of said one group desired unidirectional pulses having said predetermined pulse duration and for deriving from said translated pulses of said other groups undesired unidirectional pulses at least a portion of each of which has a pulse duration less than said predetermined pulse duration; a first repeater circuit including an input circuit coupled to said detector and responsive to said derived pulses and having a signal-stabilization network including circuit elements so proportioned as to cause the peaks of said derived pulses to be stabilized at the same potential for effecting the translation of only a portion of the peak amplitude of each of said undesired pulses and the translation of at least a portion of each of said desired pulses through said first repeater circuit; and a second repeater circuit coupled to said first repeater circuit and including a control circuit for controlling the conductivity of said second repeater circuit said control circuit being responsive to said translated portions of said desired pulses for effecting translation thereof through said second repeater while said control circuit is substantially unresponsive to the portion of each of said undesired pulses translated by said first repeater.

ROBERT B. J. BRUNN.

References Cited in the file of this patent

UNITED STATES PATENTS

| Number | Name | Date |
|---|---|---|
| 2,211,942 | White | Aug. 20, 1940 |
| 2,434,937 | Labin | Jan. 27, 1948 |
| 2,484,352 | Miller et al. | Oct. 11, 1949 |
| 2,534,264 | Hoeppner | Dec. 19, 1950 |
| 2,579,473 | Chatterjea | Dec. 25, 1951 |